United States Patent [19]

Morita et al.

[11] 4,307,209

[45] Dec. 22, 1981

[54] PROCESS FOR PRODUCTION OF CHEMICALLY BLENDED COMPOSITION OF NON-ELASTOMERIC ETHYLENE RESINS

[75] Inventors: Yoshinori Morita; Norio Kashiwa, both of Iwakuni, Japan

[73] Assignee: Mitsui Petrochemical Industries, Ltd., Tokyo, Japan

[21] Appl. No.: 167,141

[22] Filed: Jul. 9, 1980

[30] Foreign Application Priority Data

Jul. 9, 1979 [JP] Japan .................. 54-85861

[51] Int. Cl.$^3$ .......................... C08F 297/08
[52] U.S. Cl. .................. 525/246; 525/240; 525/245; 525/247
[58] Field of Search ........... 525/245, 247, 246

[56] References Cited

U.S. PATENT DOCUMENTS

| | | | |
|---|---|---|---|
| 3,644,318 | 2/1972 | Diedrich et al. | 526/124 |
| 3,759,884 | 9/1973 | Tokuzumi et al. | 526/124 |
| 4,071,672 | 1/1978 | Kashiwa | 526/122 |
| 4,071,674 | 1/1978 | Kashiwa et al. | 526/125 |
| 4,190,614 | 2/1980 | Ito et al. | 525/245 |

FOREIGN PATENT DOCUMENTS

| | | |
|---|---|---|
| 1031869 | 6/1966 | United Kingdom . |
| 1286867 | 8/1972 | United Kingdom . |
| 1292853 | 10/1972 | United Kingdom . |
| 1391804 | 4/1975 | United Kingdom . |

Primary Examiner—Stanford M. Levin
Attorney, Agent, or Firm—Sherman & Shalloway

[57] ABSTRACT

In a process for the production of a chemically blended composition of non-elastomeric ethylene resins in a multiplicity of steps in the presence of a catalyst composed of a transition metal catalyst component and an organometallic compound, which comprises (a) a step of forming (i) an ethylene polymer or an ethylene/alpha-olefin copolymer having an alpha-olefin content of up to 15% by weight, said polymer or copolymer (i) having an intrinsic viscosity [$\eta$] of 0.3 to 3, and (b) a step of forming (ii) an ethylene/alpha-olefin copolymer having an alpha-olefin content of 0.2 to 30% by weight which is more than that of the polymer or copolymer (i), said copolymer (ii) having an intrinsic viscosity [$\eta$] of 1 to 12 which is at least 1.5 times that of the polymer or copolymer (i), said step (a) being performed first and then step (b) being performed in the presence of the product of step (a), or step (b) being performed first and then step (a) being performed in the presence of the product of step (b), the improvement wherein in steps (a) and (b), ethylene is polymerized or copolymerized with the alpha-olefin (1) in the presence of a catalyst composed of (A) a highly active titanium catalyst component containing titanium, magnesium and halogen and being capable of yielding an ethylene polymer in an amount of at least 250 g/millimole of a titanium atom.hr.kg/cm$^2$ of ethylene pressure and (b) an organoaluminum compound, (2) so that the weight ratio of the polymer or copolymer (i) formed in step (a) to the copolymer (ii) formed in step (b) is (30-less than 60):(above 40–70), and (3) so that the resulting chemically blended composition has an intrinsic viscosity [$\eta$] of 1 to 6 and an alpha-olefin content of 0.2 to 20% by weight.

8 Claims, No Drawings

PROCESS FOR PRODUCTION OF CHEMICALLY BLENDED COMPOSITION OF NON-ELASTOMERIC ETHYLENE RESINS

This invention relates to an improved process for production of a chemically blended composition of non-elastomeric ethylene resins having superior processability, impact strength and resistance to environmental stress cracking and being free from a trouble of fish eyes.

Suitable ethylene resins for use in producing various molded products such as tubes, bottles and other receptacles by extrusion molding or blow molding are those which have good processability in melt-molding and give molded articles having high impact strength and high resistance to environmental stress cracking.

Known proposals for providing a non-elastomeric ethylene resin composition having these desirable properties are disclosed, for example, in Japanese Patent Publication No. 22007/70 (corresponding to British Patent No. 1,031,869) or Japanese Laid-Open Patent Publication No. 19637/73 (corresponding to West German DOS No. 2,233,983 and British Pat. No. 1,391,804) which involve use of a composition containing (a) a homopolymer of ethylene or a copolymer of ethylene and a small amount of an alpha-olefin having a medium degree of molecular weight and (b) a high-molecular-weight copolymer of ethylene and a minor proportion of an alpha-olefin, the amount of the alpha-olefin being larger than that in the copolymer (a).

The first-mentioned prior Patent Publication discloses a physically blended composition consisting of 15 to 50% by weight of a linear ethylene resin having a melt index of 2 to 20 as an ethylene polymer or copolymer corresponding to (a) and 85 to 50% by weight of a high-molecular-weight ethylene/butene-1 copolymer having a melt index of 0.0001 to 0.5 as a resin component corresponding to (b). Preparation of such a physically blended composition has the disadvantage that a physical blending means is required, and unless the blending is performed in the liquid state in solution in a suitable solvent, the blending becomes insufficient, and a number of fish eyes occur in the resulting molded articles.

The latter-mentioned prior patent discloses a method for preparing a chemically blended composition including an embodiment of forming an ethylene polymer or an ethylene/alpha-olefin copolymer corresponding to (a) above and forming an ethylene/alpha-olefin copolymer corresponding to (b) above in the presence of the resulting product (a). As the resulting chemically blended composition, a composition consisting of at least 60% by weight of the polymer or copolymer (a) and 5 to 40% by weight of the copolymer (b) is recommended. The patent also states that unlike the physically blended composition, favorable results are obtained with a chemically blended composition containing not more than 40% by weight of the copolymer (b). The largest content of the copolymer (b) formed in all of the Examples in this Patent is 26% by weight. The patent discloses only ordinary Ziegler catalysts, and fails to describe the use of a highly active titanium catalyst component containing titanium, magnesium and halogen. In this patent, the polymerization is carried out under such conditions that the resulting polymer dissolves in a polymerization solvent.

It has been found however that when a chemically blended composition having the polymer or copolymer (a) and the copolymer (b) in the proportions recommended in the above patent is formed by slurry polymerization, molded articles produced from the resulting composition cannot be free from the trouble of fish eyes.

The present inventors have made investigations in order to provide a method for producing a chemically blended composition of ethylene resins which has improved processability, impact strength and resistance to environmental stress cracking while avoiding the trouble of fish eyes which has heretofore been difficult to avoid simultaneously with the achievement of these improved properties.

It has consequently been found that a chemically blended composition of ethylene resins having superior processability, high impact strength and superior resistance to environmental stress cracking and being free from fish eyes can be easily produced by a process for the production of a chemically blended composition of non-elastomeric ethylene resins in a multiplicity of steps in the presence of a catalyst composed of a transition metal catalyst component and an organometallic compound, which comprises (a) a step of forming (i) an ethylene polymer or an ethylene/alpha-olefin copolymer having an alpha-olefin content of up to 15% by weight, said polymer or copolymer (i) having an intrinsic viscosity $[\eta]$ of 0.3 to 3, and (b) a step of forming (ii) an ethylene/alpha-olefin copolymer having an alpha-olefin content of 0.2 to 30% by weight which is more than that of the polymer or copolymer (i), said copolymer (ii) having an intrinsic viscosity $[\eta]$ of 1 to 12 which is at least 1.5 times that of the polymer or copolymer (i), step (a) being performed first and then step (b) being performed in the presence of the product of step (a), or step (b) being performed first and then step (a) being performed in the presence of the product of step (b), characterized in that ethylene is polymerized or copolymerized with the alpha-olefin under conditions (1) to (3) below in steps (a) and (b).

(1) The polymerization or copolymerization is carried out in the presence of a catalyst composed of (A) a highly active titanium catalyst component containing titanium, magnesium and halogen and being capable of yielding an ethylene polymer in an amount of at least 250 g/millimole of a titanium atom.hr.kg/cm$^2$ of ethylene pressure and (B) an organoaluminum compound.

(2) The polymerization or copolymerization is carried out so that the weight ratio of the polymer or copolymer (i) formed in step (a) to the copolymer (ii) formed in step (b) is (30 - less than 60):(above 40-70).

(3) The polymerization or copolymerization is carried out so that the resulting chemically blended composition has an intrinsic viscosity $[\eta]$ of 1 to 6 and an alpha-olefin content of 0.2 to 20% by weight.

It has been found that the above improvement can be achieved even when the polymerization or copolymerization is carried out under slurry polymerization conditions.

It is an object of this invention therefore to provide an improved process for production of a chemically blended composition of non-elastomeric ethylene resins.

The above and other objects and advantages of this invention will become more apparent from the following description.

In the present invention, the intrinsic viscosity [η] denotes an intrinsic viscosity determined in decalin at 135° C.

In the process of this invention, the polymerization or copolymerization in the multi-step process comprising steps (a) and (b) is carried out in the presence of a catalyst composed of (A) a highly active titanium catalyst component containing titanium, magnesium and halogen and being capable of yielding an ethylene polymer in an amount of at least 250 g/millimole of titanium atom.hr.kg/cm$^2$ of ethylene pressure, and (B) an organoaluminum compound [condition (1)].

The amount of the ethylene polymer yielded is preferably at least 400, more preferably at least 700, g/millimole of titanium atom.hr.kg/cm$^2$ of ethylene pressure. There is no particular upper limit to the amount of the ethylene polymer yielded, but for example, the upper limit may be about 5000 g/millimole of titanium atom.hr.kg/cm$^2$ of ethylene pressure. In the present invention, the amount of the ethylene polymer yielded is that under the conditions for practicing the steps (a) and (b).

A titanium catalyst component activated with a magnesium compound is preferred as the highly active titanium catalyst component. Examples of the highly active titanium catalyst component (A) are a solid titanium catalyst component containing magnesium, titanium and halogen as essential ingredients, and a titanium catalyst component in solution form composed of a magnesium compound, a solubilizing agent and a titanium compound dissolved in a hydrocarbon solvent. Titanium in the highly active catalyst component is usually tetravalent or trivalent. The solid titanium catalyst component (A) has a titanium content of preferably about 0.2 to about 18% by weight, more preferably about 0.3 to about 15% by weight, and a halogen/titanium mole ratio of about 4 to about 300, more preferably about 5 to about 200. Furthermore, it has a specific surface area of preferably at least about 10 m$^2$/g, more preferably about 20 to about 1000 m$^2$/g, especially preferably about 40 to about 900 m$^2$/g.

Such a solid highly active titanium catalyst component (A) is widely known, and is basically obtained by a method which comprises reacting a magnesium compound with a titanium compound to obtain a product having a high specific surface area, or a method which comprises reacting a magnesium compound having a high specific surface area with a titanium compound. According to a typical example, it is prepared by copulverization of a magnesium compound and a titanium compound, reaction at elevated temperatures of a magnesium compound having a sufficiently high specific surface area with a titanium compound, or reaction at elevated temperatures of an oxygen-containing magnesium compound with a titanium compound, or by a method which comprises reacting a magnesium compound treated with an electron donor, with a titanium compound with or without prior treatment with an organoaluminum compound or a halogen-containing silicon compound.

Various magnesium compounds are available for the production of the highly active solid titanium catalyst component (A). Examples include magnesium chloride, magnesium bromide, magnesium iodide, magnesium fluoride, magnesium hydroxide, magnesium oxide, magnesium hydroxyhalides, alkoxymagnesiums, alkoxy magnesium halides, aryloxy magnesiums, aryloxymagnesium halides, alkyl magnesium halides, and mixtures of these. These compounds may be produced by any method of production. The magnesium compounds may contain other metals or electron donors.

Tetravalent titanium compounds of the formula Ti(OR)$_{4-m}$X$_m$ (wherein R represents a hydrocarbon radical containing 1 to 12 carbon atoms, X is halogen, and $0 \leq m \leq 4$) can be cited as examples of the titanium compound used for production of the highly active solid titanium catalyst component (A). Examples include titanium tetrahalides such as TiCl$_4$, TiBr$_4$ or TiI$_4$; alkoxytitanium trihalides such as Ti(OCH$_3$)Cl$_3$, Ti(OC$_2$H$_5$)Cl$_3$, Ti(O n-C$_4$H$_9$)Cl$_3$, Ti(OC$_2$H$_5$)Br$_3$, and Ti(O iso-C$_4$H$_9$)Br$_3$; alkoxy-titanium dihalides such as Ti(OCH$_3$)$_2$Cl$_2$, Ti(OC$_2$H$_5$)$_2$Cl$_2$, Ti(O n-C$_4$H$_9$)$_2$Cl$_2$, and Ti(OC$_2$H$_5$)$_2$Br$_2$; trialkoxytitanium monohalides such as Ti(OCH$_3$)$_3$Cl, Ti(OC$_2$H$_5$)$_3$Cl, Ti(O n-C$_4$H$_9$)$_3$Cl and Ti(OC$_2$H$_5$)$_3$Br; and tetraalkoxytitanium such as Ti(OCH$_3$)$_4$, Ti(OC$_2$H$_5$)$_4$, and Ti(O n-C$_4$H$_9$)$_4$. There can also be cited titanium trihalides, such as titanium trichloride, obtained by reducing titanium tetrahalides with reducing agents such as aluminum, titanium, hydrogen or organoaluminum compounds. These titanium compounds can be utilized in combination with each other.

The electron donors used in the formation of the highly active titanium catalyst component are, for example, oxygen-containing compounds such as carboxylic acids, esters, ethers, acid amides, aldehydes, alcohols, ketones and water, and nitrogen-containing compounds such as nitriles. More specifically, they include aliphatic or aromatic carboxylic acids, aliphatic or aromatic carboxylic acid ester, aliphatic or alicyclic ethers, aliphatic or aromatic ketones, aliphatic aldehydes, aliphatic alcohols, aliphatic acid amides, water, aliphatic or aromatic nitriles, and aliphatic or aromatic amines.

It is recommended that usually the electron donor be chosen from aliphatic carboxylic acids having 1 to 12 carbon atoms, aromatic carboxylic acids having 7 or 8 carbon atoms, esters between aliphatic saturated carboxylic acids having 1 to 12 carbon atoms or aliphatic unsaturated carboxylic acids having 3 to 12 carbon atoms and aliphatic saturated alcohols having 1 to 12 carbon atoms or aliphatic unsaturated alcohols having 2 to 12 carbon atoms, esters between aromatic carboxylic acids having 7 to 12 carbon atoms and aliphatic alcohols having 1 to 12 carbon atoms, aliphatic ethers having 2 to 12 carbon atoms, cyclic ethers having 3 or 4 carbon atoms, aliphatic ketones having 2 to 13 carbon atoms, aliphatic aldehydes having 1 to 12 carbon atoms, aliphatic alcohols having 1 to 12 carbon atoms, aliphatic acid amides having 1 to 12 carbon atoms, aliphatic nitriles having 2 to 12 carbon atoms, aromatic nitriles having 7 to 12 carbon atoms, aliphatic amines having 1 to 12 carbon atoms, and aromatic amines having 5 to 7 carbon atoms.

Specific examples of these electron donors are aliphatic carboxylic acids such as acetic acid, propionic acid, valeric acid and acrylic acid; aromatic carboxylic acids such as benzoic acid or phthalic acid, aliphatic carboxylic acid esters such as methyl formate, dodecyl formate, ethyl acetate, butyl acetate, vinyl acetate, methyl acrylate, octyl acetate, ethyl laurate and octyl laurate; aromatic carboxylic acid esters such as methyl benzoate, ethyl benzoate, octyl p-hydroxybenzoate and dioctyl phthalate; aliphatic esters such as ethyl ether, hexyl ether, allylbutyl ether and methylundecyl ether; cyclic ethers such as tetrahydrofuran, dioxane and trioxane; aliphatic ketones such as acetone, methyl isobutyl ketone, ethyl butyl ketone and dihexyl ketone; aromatic ketones such as acetophenone; aliphatic aldehydes such as propionaldehyde; aliphatic alcohols such as methanol, ethanol, isopropanol, hexanol, 2-ethylhexanol, octanol and docanol; aliphatic nitriles such as acetonitrile, valeronitrile and acrylonitrile; aromatic nitriles such as benzonitrile and phthalonitrile; and aliphatic acid amides such as acetamide. The alcohols are most preferred.

The organoaluminum compound used in preparing the highly active titanium catalyst component (A) may be chosen from those exemplified hereinbelow about the organoaluminum catalyst component (B) in this invention. The halogen-containing silicon compound used in preparing the highly active titanium catalyst component is a compound having halogen directly bonded to a silicon atom, and includes, for example, silicon tetrahalides, silicon alkylhalides, silicon alkoxyhalides, and halopolysiloxanes. Specific examples are $SiCl_4$, $CH_3SiCl_3$, $(CH_3)_2SiCl_2$, $(CH_3)_3SiCl$, $(CH_3O)SiCl_3$, $(C_2H_5O)_2SiCl_2$, $(C_2H_5)_3SiCl$, and $(C_6H_5O)SiCl_3$.

Typical methods for preparing the highly active titanium catalyst component (A) are disclosed, for example, in Japanese Patent Publication No. 34092/71, Japanese Patent Publication No. 34094/71 (corresponding to U.S. Pat. No. 3,759,884 and British Pat. No. 1,189,038), Japanese Patent Publication No. 34098/71 (corresponding to U.S. Pat. No. 3,644,318 and West German DOS No. 1,795,197), Japanese Patent Publication No. 41676/72 (corresponding to British Pat. No. 1,286,867); Japanese Patent Publication No. 46269/72 (corresponding to British Pat. No. 1,292,853), Japanese Patent Publication No. 3,2270/75 (corresponding to U.S. Pat. No. 4,071,674, and British Patent No. 1,433,538), and Japanese Patent Publication No. 1796/78 (corresponding to U.S. Pat. No. 4,071,672, and British Pat. no. 1,452,314).

Compounds having one Al—C bond in the molecule can be used as the organoaluminum compound (B) constituting the catalyst used in this invention. Examples are (I) organoaluminum compounds of the general formula $R^1_mAl(OR^2)_nH_pX_q$ (wherein $R^1$ and $R^2$ represent a hydrocarbon group such as an alkyl or alkenyl group having 1 to 15 carbon atoms, preferably 1 to 4 carbon atoms, and may be identical or different, X represents halogen, m is a number represented by $0<m\leq3$, n is a number represented by $0\leq n<3$, p is a number represented by $0\leq p<3$, and q is a number represented by $0\leq q<3$ with the proviso that $m+n+p+q=3$); and (II) complex alkylated products of aluminum and a metal of Group I of the periodic table which is represented by the general formula $M^1AlR^1_4$ (wherein $M^1$ represents Li, Na or K, and $R^1$ is the same as defined above).

Examples of the organoaluminum compounds (I) are compounds of the general formula $R^1_mAl(OR^2)_{3-m}$ in which $R^1$ and $R^2$ are as defined above, and m is preferably a number represented by $1.5\leq m\leq3$; compounds of the general formula $R^1_mAlX_{3-m}$ wherein $R^1$ is as defined above, X represents a halogen atom, and m is preferably a number represented by $0<m<3$; compounds represented by the general formula $R^1_mAlH_{3-m}$ wherein $R^1$ is as defined above, an m is preferably a number represented by $2\leq m<3$; and compounds of the general formula $R^1_mAl(OR^2)_nX_q$ wherein $R^1$ and $R^2$ are as defined above, X represents a halogen atom, $0<m\leq3$, $0\leq n<3$, $0\leq q<3$, and $m+n+q=3$.

Specific examples of the organoaluminum compounds (I) are trialkyl aluminums such as triethyl aluminum and tributyl aluminum; trialkenyl aluminum such as triisoprenyl aluminum; partially alkoxylated alkyl aluminum, for example, dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; partially halogenated alkyl aluminums, for example, alkyl aluminum dihalides such as ethyl aluminum dichloride and propyl aluminum dichloride; dialkyl aluminum hydrides such as diethyl aluminum hydride and dibutyl aluminum hydride; partially hydrogenated alkyl aluminums, for example, alkyl aluminum dihydrides such as ethyl aluminum dihydride and propyl aluminum dihydride; and partially alkoxylated and halogenated alkyl aluminums such as ethyl aluminum ethoxychloride, butyl aluminum butoxychloride and ethyl aluminum ethoxybromide. As compounds similar to (I), organoaluminum compounds having at least two aluminum atoms bonded through an oxygen or nitrogen atom may also be used. Examples of such compounds are

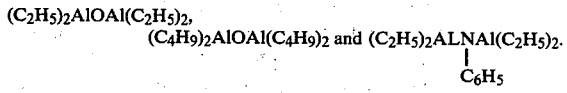

Examples of the compounds (II) are $LiAl(C_2H_5)_4$ and $LiAl(C_7H_{15})_4$.

Among the above-exemplified organoaluminum compounds, trialkyl aluminums, and alkyl aluminum halides are preferred.

In the process of this invention, an ethylene polymer or an ethylene/alpha-olefin copolymer having an alpha-olefin content of up to 15% by weight, preferably up to 10% by weight, which has an intrinsic viscosity $[\eta]$ of 0.3 to 3, preferably 0.4 to 2.5, is formed in step (a). If the alpha-olefin content of the copolymer (i) formed in step (a) exceeds the above-specified upper limit, the resulting chemically blended composition has poor resistance to environmental stress cracking. If the intrinsic viscosity of the polymer or copolymer (i) is lower than the above-specified lower limit, the composition has poor processability and molded articles prepared therefrom have marked surface roughening. On the other hand, if the intrinsic viscosity of the resulting composition is lower than the lower limit specified above, the impact strength or tear strength of the resulting composition is reduced.

In step (b) of the process of this invention, an ethylene/alpha-olefin copolymer (ii) is formed. The alpha-olefin content of the copolymer (ii) is larger than that of the polymer or copolymer (i), and is 0.2 to 30% by weight, preferably 0.3 to 20% by weight. The intrinsic viscosity of the copolymer (ii) is at least 1.5 times, preferably at least 2 times, that of the polymer or copolymer (i), and is 1 to 12, preferably 1.5 to 10.

When the alpha-olefin content and melt index of the copolymer (ii) obtained in step (b) are within the above-specified ranges, the resulting chemically blended composition has markedly improved impact strength and resistance to environmental stress cracking.

The steps (a) and (b) are performed in an optional order. Specifically, step (a) is first performed and then step (b) is performed in the presence of the product of step (a); or step (b) is first performed, and then step (a) is performed in the presence of the product of step (b). In any case, the two steps (a) and (b) should be carried out sequentially. In other words, the polymerization in the second step must be performed in the presence of the polymerization product of the first step. A chemically blended composition having reduced occurrence of fish eyes is easier to obtain by using in the second step the catalyst used in the first step, without adding a fresh supply of the titanium catalyst component in the second step.

In the process of this invention, the polymerization or copolymerization should also be carried out so that the ratio of the amount of the polymer or copolymer (i) formed in step (a) to that of the copolymer (ii) formed in step (b) is (30–less than 60):(above 40–70), preferably (40–55):(45–60) [condition (2)]. Furthermore, the polymerization or copolymerization should be carried out so that the resulting chemically blended composition has an intrinsic viscosity $[\eta]$ of 1 to 6 and an alpha-olefin content of 0.2 to 20% by weight [condition (3)].

By performing the polymerization or copolymerization under a set of conditions (1) to (3) described above, a chemically blended composition of non-elastomeric ethylene resins having the aforesaid improved properties can be formed with a good reproducibility of quality, and this can be achieved even by the slurry polymerization mode.

If the amount of the copolymer (ii) is less than 40% by weight which is outside the range specified in condition (2) above, fish eyes tend to form.

In the practice of the process of this invention, a multi-step process comprising steps (a) and (b) specified above is employed, and the polymerization or copolymerization is carried out under a specified set of conditions (1), (2) and (3). The polymerization or copolymerization itself can be performed by known means.

The polymerization or copolymerization may be carried out in the liquid phase or gaseous phase in the presence or absence of an inert solvent. The liquid-phase polymerization can be performed in slurry or solution. The process of this invention exhibits marked effects when applied to slurry polymerization or gaseous-phase polymerization. Examples of inert solvents that can be used in the polymerization are aliphatic hydrocarbons such as butane, pentane, hexane, heptane, octane, decane, dodecane and kerosene; alicyclic hydrocarbons such as cyclopentane, methylcyclopentane, cyclohexane and methylcyclohexane; and aromatic hydrocarbons such as benzene, toluene, xylene or ethylbenzene.

In performing the liquid-phase polymerization, it is desirable to use about 0.0005 to about 1 millimole, preferably about 0.001 to about 0.5 millimole, calculated as titanium atom, of the highly active titanium catalyst component (A), and the organoaluminum catalyst component (B) in an aluminum/titanium atomic ratio of from about 1 to about 200, preferably from about 10 to about 500, both per liter of the liquid phase. In performing the gaseous-phase polymerization, it is desirable to use about 0.0005 to about 1 millimole, preferably about 0.001 to about 0.5 millimole, calculated as titanium atom, of the highly active titanium catalyst component (A), and the organoaluminum compound in an aluminum/titanium atomic ratio of from about 1 to about 2000, preferably from about 10 to 1000, both per liter of the polymerization zone.

In the performance of the process of this invention, the catalyst components may be additionally fed in the second step, but the titanium catalyst component should preferably not be additionally supplied in the second step.

The suitable polymerization temperature is about 20° to about 300° C., preferably about 50° to about 200° C., and the suitable polymerization pressure is atmospheric pressure to about 100 kg/cm$^2$.G, preferably about 2 to about 50 kg/cm$^2$.G. The gaseous-phase polymerization cab be performed in the same way as in the liquid-phase polymerization except that the polymerization temperature is below the temperature at which the polymer melts, especially at about 20° to about 100° C. To control the intrinsic viscosity $[\eta]$ of the polymer, hydrogen is preferably utilized.

Examples of the alpha-olefin to be copolymerized with ethylene include propylene, 1-butene, 1-pentene, 1-hexene, 4-methyl-1-pentene, 3-methyl-1-pentene, 1-octene, 1-decene, 1-tetradecene, and 1-octadecene. Of these, alpha-olefins having 3 to 10 carbon atoms are preferred.

After the polymerization is over, the resulting chemically blended composition can be separated in the same way as in the production of polyethylene by an ordinary Ziegler method. In many cases, the product can be used in various application without performing any operation of removing the catalyst. The chemically blended ethylene resin composition obtained by the process of this invention is suitable for extrusion molding or blow molding. It has good processability, and molded products prepared therefrom have high impact strength and high resistance to environmental stress cracking. Moreover, since the molded products have a substantially reduced number of fish eyes, they are suitable for use as bottles, pipes, films and cable coatings.

The following Examples and Comparative Examples illustrate the process of this invention more specifically.

EXAMPLE 1

Synthesis of a catalyst

Commercially available anhydrous magnesium chloride (5 moles) was suspended in 10 liters of dehydrated and purified hexane in a stream of nitrogen. With stirring, 25 moles of ethanol was added dropwise over 1 hour, and the reaction was performed for 1 hour at room temperature. Then, 12 moles of diethyl aluminum chloride was added dropwise at room temperature, and the mixture was stirred for 2 hours. Then, 5 moles of titanium tetrachloride was added. The mixture was heated to 60° C., and with stirring, reacted for 3 hours. The resulting solid was separated by decantation, repeatedly washed with purified hexane, and then suspended in hexane. The concentration of Ti in the hexane suspension was determined by titration. A part of the resulting solid was dried under reduced pressure, and examined for composition. It was found that one gram of the solid contained 72 mg of titanium, 205 mg of magnesium and 610 mg of chlorine.

POLYMERIZATION

A 200 liter first-stage polymerization vessel was charged continuously with 50 liters/hr of dehydrated and purified hexane, 80 millimoles/hr of triethyl aluminum, and 2 millimoles/hr, calculated as Ti atom, of the supported catalyst obtained above. While discharging the contents of the polymerization vessel at a predetermined rate, ethylene and hydrogen were introduced at 80° C. into the vessel at a rate of 15.5 kg/hr, and 26 $Nm^3$/hr, respectively. Ethylene was thus polymerized continuously in the first stage with an average residence time of 2 hours at a total pressure of 7 $kg/cm^2$.

The hexane suspension containing polyethylene formed by the polymerization (ethylene polymer content 300 g/liter; intrinsic viscosity $[\eta]$ of polyethylene 1.10; melt index of the polymer 24.0 g/10 min.) was conducted to a flush drum at the same temperature as the polymerization temperature. Hydrogen contained in the suspension was separated, and the residue was wholly introduced into a 200 liter second-stage polymerization vessel. Without supplying additional catalyst, purified hexane was fed at a rate of 50 liters/hr, and while discharging the contents of the vessel at a predetermined rate, ethylene, 1-butene, and hydrogen were introduced at a rate of 15.5 kg/hr, 600 g/hr, and 1.2 $Nm^3$/hr, respectively. Thus, ethylene was copolymerized continuously with 1-butene in the second stage with a residence time of 1 hour at a total pressure of 7 $kg/cm^2$.

The effluent from the second-stage polymerization vessel contained 300 g/liter.hr of an ethylene polymer composition. The polymer had an intrinsic viscosity $[\eta]$ of 2.65 and a melt index of 0.22 g/10 min. The ethylene polymer composition contained 0.38% by weight of 1-butene comonomer, and had a density of 0.955 $g/cm^3$.

The ratio of the polymers in the first and second stages was 50:50, and the ethylene copolymer formed in the second-stage polymerization vessel alone has an intrinsic viscosity $[\eta]$ of 4.20, and 1-butene content of 0.96% by weight. The total activity of the catalyst in the first and second steps was 1610 g-polymer/millimole of Ti.hr.kg/$cm^2$ of ethylene pressure.

The resulting ethylene polymer composition obtained by the above method was subjected to a standard testing method for environmental stress cracking described in ASTM-D-1693-70 (bent strip method, 25% by weight solution of surfactant Antarox A400) to determine $F_{50}$ (the time that elapsed until cracking occurred in 50 % of samples, as determined from the logarithmic probability distribution). The $F_{50}$ of the resulting composition was more than 1000 (i.e., no cracks formed in the samples even after a lapse of more than 1000 hours). Thus, the resulting ethylene polymer composition had very good resistance to environmental stress cracking.

Fish eyes of the resulting composition were measured by the following method. It was found that there was hardly any formation of fish eyes, and the fish eyes rating of the composition was 5.

It is seen from the above results that the resulting composition had very good properties for blow molding.

MEASUREMENT OF FISH EYES

The composition was pelletized by a pelletizer. Using the resulting pellets, an inflation film, 30 microns thick, was prepared. The film was cut off to a size of 30 cm $\times$ 30 cm, and the number of fish eyes was counted. The number was rated as follows.

Higher ratings show lesser numbers of fish eyes, and thus better quality of the film.

| Number of fish eyes | Rating |
|---|---|
| 0–5 | 5 |
| 6–10 | 4 |
| 11–20 | 3 |
| 21–30 | 2 |
| 31 or more | 1 |

EXAMPLES 2 TO 13

An ethylene polymer composition was produced in the same way as in Example 1 except that the ratio of the amount of the polymer in the first step to that of the second step, the proportions of the comonomers fed in the first and second steps, the type of the comonomers, and the polymerization conditions were changed as shown in Table 1. The $F_{50}$ of the resulting ethylene polymer composition was measured by the method of ASTM-D-1693-70. It was found that in these examples, ethylene polymer compositions having much better resistance to environmental stress cracking than the compositions obtained in Comparative Examples were obtained. Moreover, fish eyes hardly formed in molded articles prepared from the composition obtained in these Examples. The results are shown in Table 1.

COMPARATIVE EXAMPLE 1

Example 1 was repeated except that 1-butene was copolymerized with ethylene in the first step to form an ethylene copolymer having an intrinsic viscosity $[\beta]$ of 1.04, a melt index of 31.0 g/10 min., a density of 0.952 $g/cm^3$ and a 1-butene content of 1.04% by weight, and the product was continuously fed into the second-stage polymerization reactor. The ethylene polymer composition continuously discharged from the second-stage polymerization vessel had an intrinsic viscosity $[\eta]$ of 2.68, a melt index of 0.24 g/10 min. and a density of 0.954 $g/cm^3$. The ethylene polymer formed only in the second-stage polymerization vessel had an intrinsic viscosity $[\eta]$ of 4.32, and did not contain 1-butene. The total activity of the catalyst in the first and second stages was 1470 g of polymer/millimole of Ti atom.hr.kg/$cm^2$ of ethylene pressure.

The resulting ethylene polymer composition was tested for resistance to environmental stress cracking by the method of ASTM-D-1693-70, and was found to have an $F_{50}$ of 28 hours, which was much shorter than those in the Examples.

COMPARATIVE EXAMPLE 2

A 200-liter single-stage continuous polymerization vessel was continuously charged with 50 liters/hr of dehydrated and purified hexane, 80 millimoles/hr of triethyl aluminum, and 1.5 millimoles/hr, calculated as Ti atom, of the supported catalyst obtained in Example 1, and while discharging the contents of the polymerization vessel at a predetermined speed, ethylene, 1-butene, and hydrogen were introduced at 80° C. at a rate of 15.0 kg/hr, 350 g/hr, and 6 $Nm^3$/hr, respectively. Thus, ethylene and 1-butene were copolymerized under a total pressure of 7 $kg/cm^2$.

The ethylene copolymer formed continuously by the polymerization had an intrinsic viscosity $[\eta]$ of 2.61, a melt index of 0.29 g/10 min., a 1-butene content of 0.43% by weight, and a density of 0.953 g/cm$^3$. The activity of the catalyst was 1150 g of polymer/millimole of Ti atom.hr.kg/cm$^2$ of ethylene pressure. The resistance to environmental stress cracking of the resulting ethylene copolymer was examined by the same method as in Example 1. It was found to have an F$_{50}$ of 97 hours, showing much inferior stress cracking resistance to that in the Examples.

Comparative Example 3

In the procedure of Example 1, 1-butene was fed substantially equally to the first-stage and second-stage polymerization vessels. In the first-stage polymerization vessel, an ethylene copolymer having an intrinsic viscosity [$\eta$] of 1.08, a melt index of 24.0 g/10 min., a density of 0.959 g/cm$^3$ and a 1-butene content of 0.51 % by weight was obtained, and continuously fed into the second-stage polymerization vessel. The ethylene polymer composition which continuously flowed out of the second-stage polymerization vessel had an intrinsic viscosity [$\eta$] of 2.66, a melt index of 0.28 g/10 min., a density of 0.954 g/cm$^3$ and a 1-butene content of 0.50% by weight.

The polymer formed in the second-stage polymerization vessel alone had an intrinsic viscosity [$\eta$] of 4.24 and a 1-butene content of 0.49% by weight. The total activity of the catalyst in the first and second stages was 1440 g of polymer/millimole of Ti atom.hr.kg/cm$^2$ of ethylene pressure.

The environmental stress cracking resistance of the resulting ethylene polymer composition was examined by the same method as in Example 1. It was found to have an F$_{50}$ of 144 hours, showing inferior stress cracking resistance to that in the Examples.

COMPARATIVE EXAMPLE 4

In the procedure of Examples 12 and 13, 1-butene was fed substantially equally to the first-stage and second-stage polymerization vessels. In the first-stage polymerization vessel, an ethylene copolymer having an intrinsic viscosity [$\eta$] of 0.79, a melt index of 125g/10 min., a density of 0.955 g/cm$^3$, and a 1-butene content of 5.3% by weight, and was continuously fed into the second-stage polymerization vessel. The ethylene polymer composition which flowed continuously from the second-stage polymerization vessel had an intrinsic viscosity [$\eta$] of 3.21, a melt index of 0.10 g/10 min., a 1-butene content of 5.3% by weight, and a density of 0.933 g/cm$^3$. The copolymer formed only in the second-stage polymerization vessel had an intrinsic viscosity [$\eta$] of 5.63 and a 1-butene content of 5.3% by weight. The total activity of the catalyst in the first and second stages was 820 g of polymer/millimole of Ti atom.hr.kg/cm$^2$ of ethylene pressure.

The environmental stress cracking resistance of the resulting ethylene polymer composition was examined by the same method as in Example 1. It was found to have an F$_{50}$ of 107 hours, showing inferior stress cracking resistance to that in Examples 12 and 13.

COMPARATIVE EXAMPLE 5

In the procedure of Example 1, the polymerization conditions were changed so that the weight ratio of the ethylene polymer formed in the first stage to that formed in the second stage was 72/28. In the first stage, an ethylene polymer free from 1-butene was obtained which had an intrinsic viscosity [$\eta$] of 1.63, a melt index of 3.40 g/10 min. and a density of 0.969 g/cm$^3$. The ethylene polymer was fed continuously to the second-stage polymerization vessel. The ethylene polymer composition which flowed out continuously from the second-stage polymerization vessel had an intrinsic viscosity [$\eta$] 2.69, a melt index of 0.25 g/10 min. and a 1-butene content of 0.50% by weight. The polymer formed in the second-stage polymerization vessel alone had an intrinsic viscosity [$\eta$] of 5.41 and a 1-butene content of 1.79% by weight. The activity of the catalyst was 1020 g of polymer/millimole of Ti atom.hr.kg/cm$^2$ of ethylene pressure.

The resulting ethylene polymer composition had much the same properties as the composition obtained in Example 1.

The environmental stress cracking resistance of the resulting ethylene polymer composition was examined. It was found to have an F$_{50}$ of 733 hours. But the composition had a fish eye rating of 1, showing that at the time of blow molding, a number of fish eyes occurred in the molded products, and the molded products had no merchandise value.

COMPARATIVE EXAMPLE 6

Synthesis of a catalyst

Two moles of TiCl$_4$ was put into 1 liter of dehydrated and purified kerosene in a stream of nitrogen, and at 0° C. 2.2 moles of ethyl aluminum sesquichloride was added dropwise with stirring over 2 hours. After the addition, the temperature was raised to 60° C. over the course of 1 hour, and the reaction was performed at 60° C. for 2 hours. After the reaction, the resulting solid portion was separated by decantation, and repeatedly washed with dehydrated and purified hexane. The concentration of Ti in the hexane suspension was determined by titration. A part of the resulting solid was dried under reduced pressure, and examined for composition. It was found that one gram of solid contained 185 mg of titanium, 570 mg of Cl and 83 mg of Al.

Polymerization

The same 200 ml first-stage polymerization vessel as used in Example 1 was continuously charged with 25 liters/hr of dehydrated and purified hexane as a solvent, 100 millimoles/hr of diethyl aluminum chloride and 12.5 millimoles/hr calculated as Ti atom of the solid catalyst prepared as above. While discharging the contents of the polymerization vessel at a predetermined rate, ethylene and hydrogen were introduced into the vessel at 80° C. at a rate of 8.0 kg/hr, and 14.2 Nm$^3$/hr, respectively. Ethylene was thus continuously polymerized in the first stage with an average residence time of 4 hours at a total pressure of 8 kg/cm$^2$.

The hexane suspension containing polyethylene formed by the polymerization (ethylene polymer content 300 g/liter, the polyethylene had an intrinsic viscosity of 1.02 and a melt index of 28.5 g/10 min.) was conducted to a flush drum at the same temperature as the polymerization temperature, to separate hydrogen contained in the suspension. The residue was entirely fed into a 200-liter second-stage polymerization vessel, and without additionally supplying the catalyst, purified hexane was fed at a rate of 25 liters/hr. While discharging the contents of the vessel at a predetermined rate, ethylene, 1-butene and hydrogen were introduced into the vessel at 80° C. at a rate of 8.0 kg/hr, 360 g/hr, and 0.8 Nm$^3$/hr, respectively. Thus, ethylene was copolymerized with 1-butene continuously with a residence time of 2 hours at a total pressure of 8 kg/cm².

The effluent from the second-stage polymerization contained 300 g/liter.hr of an ethylene polymer composition. The polymer had an intrinsic viscosity $[\eta]$ of 2.74 and a melt index of 0.19 g/10 min. The 1-butene copolymer was contained in the ethylene polymer composition in an amount of 0.49% by weight. The density of the ethylene polymer composition was 0.954 g/cm³. The weight ratio of the polymer formed in the first stage to that formed in the second stage was 50 : 50. The ethylene copolymer formed only in the second-stage polymerization vessel had an intrinsic viscosity $[\eta]$ of 4.46 and a 1-butene content of 0.98% by weight. The total activity of the catalyst in the first and second stages was about 54 g of polymer/millimole of Ti atom.hr.kg/cm² of ethylene pressure. Since the catalyst activity was low, the catalyst had to be removed from the resulting ethylene polymer composition by using methanol.

The environmental stress cracking resistance of the resulting ethylene polymer composition was examined in the same way as in Example 1. It was found to have an $F_{50}$ of 267 hours, showing inferior stress cracking resistance to that in Example 1. It had a fish eye rating of 3, and a number of fish eyes occurred during blow molding of the resulting composition. The molded products were therefore of very low merchandise value.

COMPARATIVE EXAMPLE 7

The polymer obtained in the first stage of Example 1 and the polymer formed in the first stage of Example 6 were separately withdrawn from the polymerization vessels and dried. The resulting polymers were well mixed in a ratio of 1:1 by a Henschel mixer, and pelletized by a pelletizer.

The pellets were molded, and their environmental stress cracking resistance was examined by the method of ASTM-D-1693-70 in the same way as in Example 1. The $F_{50}$ was 580 hours, and the fish eye rating was 1.

TABLE 1

| Example | Polymerization conditions | | | Properties of the ethylene polymer from the first-stage polymerization vessel | | | Properties of the ethylene polymer composition | | | Properties of the ethylene polymer formed in the second-stage polymerization vessel alone | |
|---|---|---|---|---|---|---|---|---|---|---|---|
| | Temperature (°C.) | Pressure (kg/cm²) | alpha-olefin | $[\eta]$ | Density (g/cm³) | alpha-olefin content (wt. %) | $[\eta]$ | Density (g/cm³) | alpha-olefin content (wt. %) | $[\eta]$ | alpha-olefin content (wt. %) |
| 1 | 80 | 7 | 1-butene | 1.10 | 0.974 | 0 | 2.65 | 0.955 | 0.48 | 4.20 | 0.96 |
| 2 | 80 | 7 | 1-butene | 1.07 | 0.966 | 0.18 | 2.82 | 0.956 | 0.49 | 4.57 | 0.80 |
| 3 | 80 | 7 | 1-butene | 0.62 | 0.975 | 0 | 2.77 | 0.954 | 0.51 | 4.92 | 1.02 |
| 4 | 80 | 7 | 1-butene | 1.02 | 0.973 | 0 | 2.62 | 0.955 | 0.50 | 4.58 | 1.11 |
| 5 | 80 | 7 | 1-butene | 0.95 | 0.974 | 0 | 2.70 | 0.953 | 0.54 | 3.87 | 0.90 |
| 6 | 80 | 7 | 1-butene | 4.55 | 0.944 | 1.02 | 2.77 | 0.954 | 0.51 | 0.99 | 0 |
| 7 | 80 | 7 | 1-butene | 3.24 | 0.947 | 0.77 | 2.60 | 0.955 | 0.50 | 1.41 | 0 |
| 8 | 80 | 7 | 4-methyl-1-pentene | 1.08 | 0.974 | 0 | 2.75 | 0.953 | 0.61 | 4.42 | 1.22 |
| 9 | 80 | 7 | propylene | 1.05 | 0.968 | 0.10 | 2.71 | 0.953 | 0.52 | 4.37 | 0.94 |
| 10 | 140 | 25 | 1-butene | 1.60 | 0.970 | 0 | 2.40 | 0.957 | 0.48 | 3.50 | 1.07 |
| 11 | 140 | 25 | propylene | 0.86 | 0.973 | 0 | 2.09 | 0.949 | 1.07 | 3.32 | 2.14 |
| 12 | 60 | 5 | 1-butene | 0.82 | 0.967 | 1.25 | 3.17 | 0.934 | 5.30 | 5.52 | 9.35 |
| 13 | 60 | 5 | 1-butene | 0.72 | 0.975 | 0 | 3.25 | 0.933 | 5.15 | 5.78 | 10.30 |

| Example | Amount of ethylene polymer yielded (g-polymer/millimole of Ti atom . hr . kg/cm² of ethylene pressure) | Weight ratio of the polymer formed in the first-stage to the polymer formed in the second-stage | Ratio of the alpha-olefin in the polymer or copolymer (i) to that in the copolymer (ii) | $F_{50}$ (hours) by the environmental stress cracking test by ASTM-D-1693-70 | Fish eye rating |
|---|---|---|---|---|---|
| 1 | 1610 | 50/50 | 0/100 | more than 1000 | 5 |
| 2 | 1420 | 50/50 | 18/82 | 320 | 5 |
| 3 | 1090 | 50/50 | 0/100 | 841 | 5 |
| 4 | 1560 | 55/45 | 0/100 | 932 | 4 |
| 5 | 1680 | 40/60 | 0/100 | more than 1000 | 5 |
| 6 | 940 | 50/50 | 0/100 | 686 | 5 |
| 7 | 1270 | 65/35 | 0/100 | 355 | 4 |
| 8 | 1550 | 50/50 | 0/100 | more than 1000 | 5 |
| 9 | 1600 | 50/50 | 9.6/90.4 | 495 | 5 |
| 10 | 890 | 55/45 | 0/100 | 389 | 4 |
| 11 | 670 | 50/50 | 0/100 | 290 | 5 |
| 12 | 1710 | 50/50 | 11.8/88.2 | 377 | 5 |
| 13 | 1670 | 50/50 | 0/100 | 740 | 5 |

What we claim is:

1. In a process for the production of a chemically blended composition of non-elastomeric ethylene resins in a multiplicity of steps in the presence of a catalyst composed of a transition metal catalyst component and an organometallic compound, which comprises (a) a step of forming (i) an ethylene polymer or an ethylene/alpha-olefin copolymer having an alpha-olefin content of up to 15% by weight, said polymer or copolymer (i) having an intrinsic viscosity $[\eta]$ of 0.3 to 3, and (b) a step of forming (ii) an ethylene/alpha-olefin copolymer having an alpha-olefin content of 0.2 to 30% by weight which is more than that of the polymer or copolymer (i), said copolymer (ii) having an intrinsic viscosity [η] of 1 to 12 which is at least 1.5 times that of the polymer or copolymer (i), said step (a) being performed first and then step (b) being performed in the presence of the product of step (a), or step (b) being performed first and then step (a) being performed in the presence of the product of step (b); the improvement wherein in steps (a) and (b), ethylene is polymerized or copolymerized with the alpha-olefin (1) in the presence of a catalyst composed of (A) a highly active titanium catalyst component containing titanium, magnesium and halogen and being capable of yielding an ethylene polymer in an amount of at least 250 g/millimole of a titanium atom.hr.kg/cm² of ethylene pressure and (B) an organoaluminum compound, (2) so that the weight ratio of the polymer or copolymer (i) formed in step (a) to the copolymer (ii) formed in step (b) is (30—less than 60): (above 40-70), and (3) so that the resulting chemically blended composition has an intrinsic viscosity [η] of 1 to 6 and an alpha-olefin content of 0.2 to 20% by weight.

2. The process of claim 1 wherein the polymerization or copolymerization in steps (a) and (b) is carried out under slurry polymerization conditions.

3. The process of claim 1 wherein the weight ratio of the polymer or copolymer (i) formed in step (a) to the copolymer (ii) formed in step (b) is 40-55 to 45-60.

4. The process of claim 1 wherein an ethylene/alpha-olefin copolymer is formed in step (a) and has an alpha-olefin content of up to 10% by weight and an intrinsic viscosity [η] of 0.4 to 2.5.

5. The process of claim 1 wherein the copolymer (ii) formed in step (b) has an intrinsic viscosity [η] of 1.5 to 10 which is at least 2 times that of the polymer or copolymer (i).

6. The process of claim 1 wherein said highly active titanium catalyst component has a titanium content of from about 0.2 to about 18% by weight, and a halogen/titanium mole ratio of from about 4 to about 300, and a specific surface area of at least about 10m²/g, the titanium being in the tetravalent or trivalent state.

7. The process of claim 6 wherein said highly active titanium catalyst component further comprises an electron donor selected from the group consisting of aliphatic carboxylic acids, aromatic carboxylic acids, aliphatic carboxylic acid esters, aromatic carboxylic acid esters, aliphatic ethers, alicyclic ethers, aliphatic ketones, aromatic ketones, aliphatic aldehydes, aliphatic alcohols, aliphatic acid amides, water, aliphatic nitriles, aromatic nitriles, aliphatic amines and aromatic amines.

8. The process of claim 6 wherein the titanium of the highly active titanium catalyst component is derived from a tetravalent titanium compound of the formula $Ti(OR)_{4-m}X_m$, wherein R represents a hydrocarbon radical containing 1 to 12 carbon atoms, X is halogen, and $0 \leq m \leq 4$; and wherein the magnesium of the highly active titanium catalyst component is derived from a magnesium compound selected from the group consisting of magnesium chloride, magnesium bromide, magnesium iodide, magnesium fluoride, magnesium hydroxide, magnesium oxide, magnesium hydroxyhalides, alkoxymagnesiums, alkoxy magnesium halides, aryloxy magnesiums, aryloxymagnesium halides, and alkyl magnesium halides, or mixtures thereof.

* * * * *